(12) United States Patent
Sokolov

(10) Patent No.: US 9,223,961 B1
(45) Date of Patent: *Dec. 29, 2015

(54) SYSTEMS AND METHODS FOR PERFORMING SECURITY ANALYSES OF APPLICATIONS CONFIGURED FOR CLOUD-BASED PLATFORMS

(75) Inventor: Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/439,458

(22) Filed: Apr. 4, 2012

(51) Int. Cl.
G06F 7/00 (2006.01)
G06F 21/51 (2013.01)
G06F 21/57 (2013.01)

(52) U.S. Cl.
CPC .............. *G06F 21/51* (2013.01); *G06F 21/57* (2013.01)

(58) Field of Classification Search
CPC ......... G06F 21/51; G06F 21/56; G06F 21/57; G06F 21/566; G06F 17/30864; G06F 17/30867
USPC ............ 726/22–25, 1; 709/204, 224; 707/707
See application file for complete search history.

(56) References Cited

U.S. PATENT DOCUMENTS

| | | | |
|---|---|---|---|
| 7,630,953 B2 * | 12/2009 | Stauber et al. | 1/1 |
| 8,516,590 B1 * | 8/2013 | Ranadive et al. | 726/24 |
| 2002/0010855 A1 * | 1/2002 | Reshef et al. | 713/164 |
| 2006/0282896 A1 * | 12/2006 | Qi | 726/25 |
| 2008/0270451 A1 | 10/2008 | Thomsen et al. | |
| 2010/0153862 A1 * | 6/2010 | Schreiber | 715/760 |
| 2010/0299752 A1 * | 11/2010 | Yu | 726/22 |
| 2011/0167474 A1 * | 7/2011 | Sinha et al. | 726/1 |
| 2011/0247074 A1 * | 10/2011 | Manring et al. | 726/26 |
| 2012/0042384 A1 * | 2/2012 | Badhwar et al. | 726/25 |
| 2012/0054871 A1 * | 3/2012 | Soby et al. | 726/25 |
| 2012/0066738 A1 * | 3/2012 | Cohan | 726/1 |
| 2012/0124659 A1 | 5/2012 | Craft et al. | |
| 2012/0216244 A1 * | 8/2012 | Kumar et al. | 726/25 |
| 2012/0317645 A1 * | 12/2012 | Fortier | 726/24 |
| 2013/0212611 A1 * | 8/2013 | Van Aacken et al. | 725/23 |
| 2013/0212684 A1 * | 8/2013 | Li et al. | 726/25 |
| 2013/0263209 A1 * | 10/2013 | Panuganty | 726/1 |
| 2013/0282994 A1 * | 10/2013 | Wires et al. | 711/158 |

OTHER PUBLICATIONS

Kevin Hamlen et al, Security Issues for Cloud Computing, pp. 39-51, International Journal of Information Security and Privacy, IGI Global, 2010.*

Ilya Sokolov; Systems and Methods for Classifying Applications Configured for Cloud-Based Platforms; U.S. Appl. No. 13/439,468, filed Apr. 4, 2012.

uProtect.it; Scan, Score, and Protect your Facebook from Suspicious 3rd Party Applications; https://uprotect.it/appscan; 2011.

* cited by examiner

*Primary Examiner* — Shanto M Abedin

(74) *Attorney, Agent, or Firm* — ALG Intellectual Property, LLC

(57) ABSTRACT

A computer-implemented method for performing security analyses of applications configured for cloud-based platforms may include 1) identifying an online platform that hosts an online service and that is capable of hosting a plurality of third-party applications integrated with the online service and configured to operate on the online platform, 2) identifying at least one third-party application that is integrated with the online service and configured to operate on the online platform, 3) identifying metadata describing at least one characteristic of the third-party application, and 4) performing a security analysis of the third-party application based at least in part on the metadata. Various other methods, systems, and computer-readable media are also disclosed.

20 Claims, 7 Drawing Sheets

Metadata
410

| | |
|---|---|
| Name | Free Poker Deluxe |
| Vendor | Acme Corp. |
| Vendor categories | Unknown |
| Post topics | Games, Coupons |
| Message topics | Gambling, Medicine, Investment |
| Description topics | Games, Entertainment, Gambling |
| User Comment topics | Fraud, Games |
| Permissions | Post-to-Friend, Access-Phone-Number Send-Message, Access-Contacts |

Metadata
420

| | |
|---|---|
| Name | Digital Album Maker |
| Vendor | Example Software, Inc. |
| Vendor categories | Organization, Photography |
| Post topics | Photography |
| Description topics | Photography, Family |
| Comment topics | Computers, Photography |
| Permissions | Post-to-Stream, Access-Albums |

| | | |
|---|---|---|
| Name | Quiz-and-Win | |
| Vendor | Symantec | FLAG: inconsistent with vendor |
| Location | example.com/malware | |
| Type | Quiz, Drugs | FLAG: inappropriate content (drugs) |
| Post topics | Banking | FLAG: phishing threat |
| Post frequency | 10 messages per day per user | FLAG: spam |
| Canvas document content | Executable download links | FLAG: downloadable virus |
| Permissions | Post-to-Wall, Manage-Friends | FLAG: unusual permission for type (Manage-Friends, Quiz) |

SYSTEMS AND METHODS FOR PERFORMING SECURITY ANALYSES OF APPLICATIONS CONFIGURED FOR CLOUD-BASED PLATFORMS

BACKGROUND

Internet users increasingly rely on cloud-based services for social networking, shopping, gaming, and other activities. Some cloud-based services have achieved user bases of hundreds of millions of users and have extended their platforms to attract more users and/or keep existing users within the services' online ecosystems. For example, some cloud-based services have provided interfaces for creating cloud-based applications that third-party vendors may use to provide applications via the cloud-based services and/or customize users' experiences within these services.

In order to encourage vendor participation and development of new and useful third-party applications, a cloud-based service may maintain relatively low standards for vendor registration and submissions. Unfortunately, the large user bases available under these uniform platforms may attract undesirable vendors and third-party applications, potentially bringing scams, phishing attempts, spam attacks, and/or unwanted content to users. Traditional security systems for identifying and remediating illegitimate content may fail to correctly analyze third-party applications delivered via cloud-based services without understanding what the third-party applications are about and/or purport to accomplish. Accordingly, the instant disclosure identifies and addresses a need for additional and improved systems and methods for performing security analyses of applications configured for cloud-based platforms.

SUMMARY

As will be described in greater detail below, the instant disclosure generally relates to systems and methods for performing security analyses of applications configured for cloud-based platforms by identifying the applications (e.g., as separate from the cloud-based platforms which host them) and identifying metadata (e.g., by requesting, extracting, crawling for, and/or mining for the metadata) useful for providing context to the applications (e.g., for the trustworthiness of the applications, the expected behavior of the applications, etc.). In one example, a computer-implemented method for performing security analyses of applications configured for cloud-based platforms may include 1) identifying an online platform that hosts an online service and that is capable of hosting a plurality of third-party applications integrated with the online service and configured to operate on the online platform, 2) identifying at least one third-party application that is integrated with the online service and configured to operate on the online platform, 3) identifying metadata describing at least one characteristic of the third-party application, and 4) performing a security analysis of the third-party application based at least in part on the metadata.

In some examples, identifying the metadata may include identifying a classification of the third-party application. In these examples, the computer-implemented method may also include 1) identifying an expected behavior of the third-party application based at least in part on the classification and 2) identifying an actual behavior of the third-party application. Additionally, in these examples performing the security analysis may include determining that the expected behavior of the third-party application is inconsistent with the actual behavior of the third-party application.

In some embodiments, identifying the metadata may include 1) identifying a classification of the third-party application and 2) identifying at least one permission used by the third-party application within the online platform. In these embodiments, the computer-implemented method may also include identifying a set of expected permissions to be used by the third-party application based on the classification of the third-party application. Additionally, in these embodiments performing the security analysis may include determining that the permission used by the third-party application is not within the set of expected permissions.

In one example, identifying the metadata may include 1) identifying an actual vendor of the third-party application and 2) identifying user-facing content within the third-party application indicating an apparent vendor of the third-party application. In this example, performing the security analysis may include determining that the actual vendor of the third-party application differs from the apparent vendor of the third-party application.

In one embodiment, identifying the metadata may include 1) identifying a classification of the third-party application, 2) identifying content generated by the third-party application within the online service, and 3) analyzing the content to identify at least one topic of the content. In this embodiment, the computer-implemented method may also include identifying an expected topic of the third-party application based on the classification. Additionally, in this embodiment performing the security analysis may include determining that the expected topic does not match the topic of the content.

In some examples, identifying the metadata may include 1) identifying a classification of the third-party application and 2) identifying a volume of content generated by the third-party application within the online service. In these examples, the computer-implemented method may also include identifying an expected volume of content generated by the third-party application based on the classification. Additionally, in these examples performing the security analysis may include determining that the volume of content generated by the third-party application exceeds the expected volume of content.

In some embodiments, identifying the metadata may include 1) identifying content within a canvas page including at least a portion of the third-party application and 2) identifying an Internet resource provided via the canvas page. In these embodiments, performing the security analysis may include determining that the Internet resource is malicious.

In one example, identifying the metadata may include identifying content generated by the third-party application within the online service. In this example, performing the security analysis may include determining that the content generated by the third-party application includes spam content.

In some examples, identifying the metadata may include identifying at least one rating used to describe the third-party application. In these examples, performing the security analysis may include determining that the rating falls below a predetermined threshold.

In some embodiments, identifying the metadata may include identifying a user account for the online service usable for testing third-party application integrated with the online service. In these examples, performing the security analysis may include loading the third-party application within the online service via the user account.

In one embodiment, a system for implementing the above-described method may include 1) an identification module programmed to identify an online platform that hosts an online service and that is capable of hosting a plurality of third-party applications integrated with the online service and configured to operate on the online platform, 2) an application module programmed to identify at least one third-party application that is integrated with the online service and configured to operate on the online platform, 3) a metadata module programmed to identify metadata describing at least one characteristic of the third-party application, and 4) a security module programmed to perform a security analysis of the third-party application based at least in part on the metadata. The system may also include at least one processor configured to execute the identification module, the application module, the metadata module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an online platform that hosts an online service and that is capable of hosting a plurality of third-party applications integrated with the online service and configured to operate on the online platform, 2) identify at least one third-party application that is integrated with the online service and configured to operate on the online platform, 3) identify metadata describing at least one characteristic of the third-party application, and 4) perform a security analysis of the third-party application based at least in part on the metadata.

As will be explained in greater detail below, by identifying the applications (e.g., as separate from the cloud-based platforms which host them) and identifying metadata (e.g., by requesting, extracting, crawling for, and/or mining for the metadata) useful for providing context to the applications (e.g., for the trustworthiness of the applications, the expected behavior of the applications, etc.), the systems and methods described herein may facilitate and/or enable the limiting of access to illegitimate, malicious, and/or undesired third-party applications within otherwise trusted cloud-based platforms.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a diagram of exemplary metadata of applications configured for cloud-based platforms.

FIG. 5 is a diagram of exemplary metadata of applications configured for cloud-based platforms.

Figure 1:
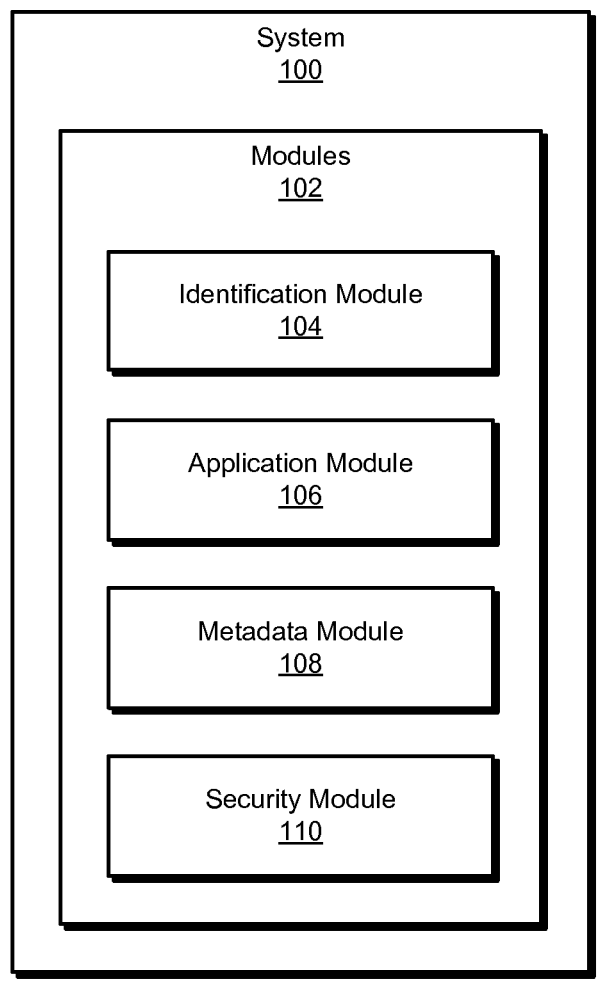
FIG. 1 is a block diagram of an exemplary system for performing security analyses of applications configured for cloud-based platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
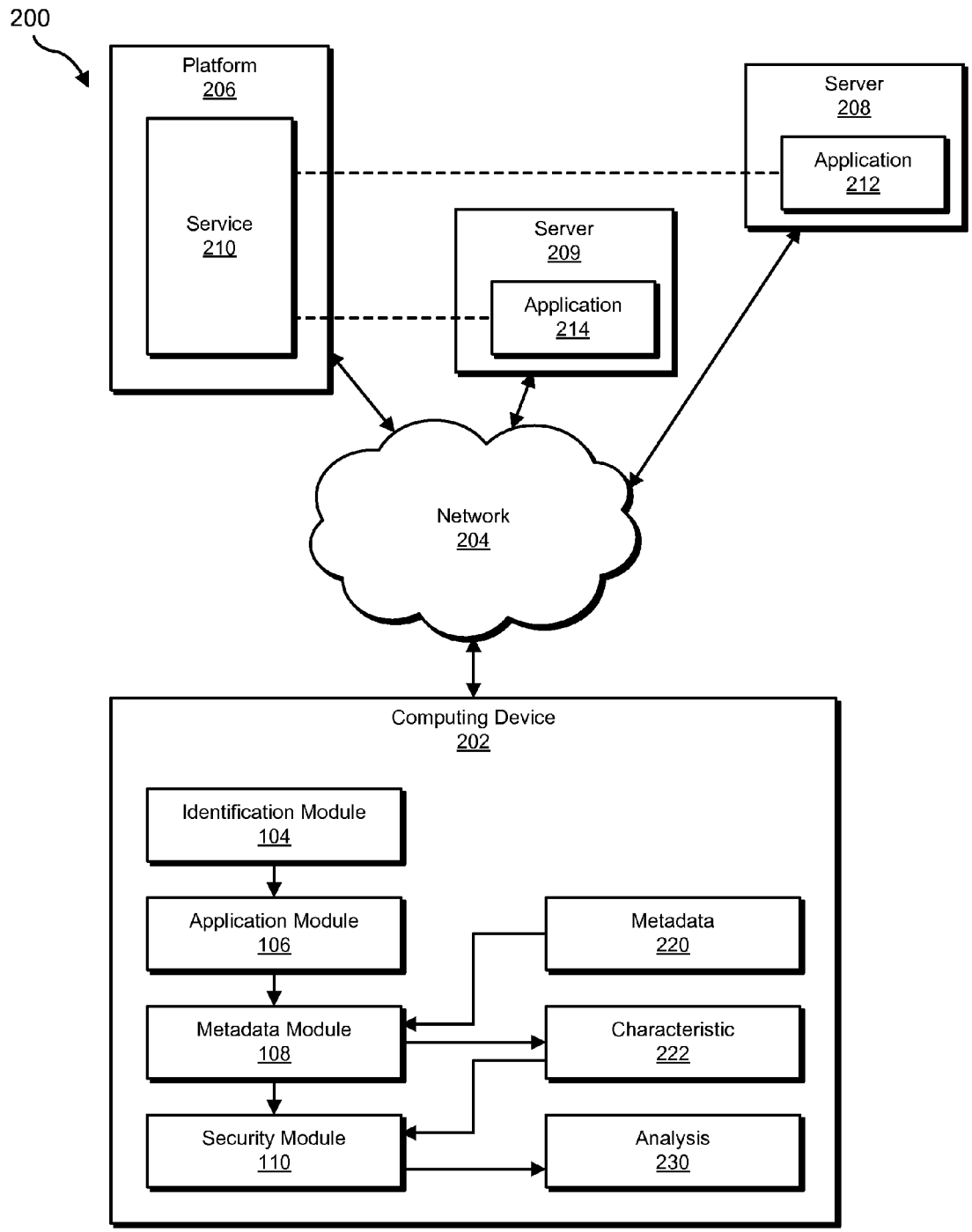
FIG. 2 is a block diagram of an exemplary system for performing security analyses of applications configured for cloud-based platforms.

The following will provide, with reference to FIGS. 1-2, detailed descriptions of exemplary systems for performing security analyses of applications configured for cloud-based platforms. Detailed descriptions of corresponding computer-implemented methods will also be provided in connection with FIG. 3. Detailed descriptions of exemplary metadata of applications configured for cloud-based platforms will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for performing security analyses of applications configured for cloud-based platforms. As illustrated in this figure, exemplary system 100 may include one or more modules 102 for performing one or more tasks. For example, and as will be explained in greater detail below, exemplary system 100 may include an identification module 104 programmed to identify an online platform that hosts an online service and that is capable of hosting a plurality of third-party applications integrated with the online service and configured to operate on the online platform. Exemplary system 100 may also include an application module 106 programmed to identify at least one third-party application that is integrated with the online service and configured to operate on the online platform. Exemplary system 100 may additionally include a metadata module 108 programmed to identify metadata describing at least one characteristic of the third-party application.

In addition, and as will be described in greater detail below, exemplary system 100 may include a security module 110 programmed to perform a security analysis of the third-party application based at least in part on the metadata. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or platform 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a platform 206 via a network 204 (e.g., to access a service 210).

In one embodiment, one or more of modules 102 from FIG. 1 may, when executed by at least one processor of computing device 202, facilitate computing device 202 in performing security analyses of applications configured for cloud-based platforms. For example, and as will be described in greater detail below, identification module 104, application module 106, metadata module 108, and/or security module 110 may cause computing device 202 to 1) identify an online platform 206 that hosts an online service 210 and that is capable of hosting a plurality of third-party applications (e.g., applications 212 and 214) integrated with service 210 and configured to operate on platform 206, 2) identify at least one third-party application (e.g., application 212) that is integrated with service 210 and configured to operate on platform 206, 3) identify metadata 220 describing at least one characteristic (e.g., a characteristic 222) of application 212, and 4) perform a security analysis 230 of application 212 based at least in part on metadata 220 (e.g., based on characteristic 222).

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Platform 206 generally represents any type or form of computing device that is capable of hosting, delivering, and/or referencing applications and/or services online. Examples of platform 206 include, without limitation, application servers and database servers configured to provide various database services and/or run certain software applications. In one example, service 210 may, as a part of platform 206, provide references to servers 208 and 209 for loading applications 212 and 214 (e.g., by serving a web document including an IFRAME that loads application 212 from server 208 and/or application 214 from server 209). Additionally or alternatively, platform 206 may include and/or store applications 212 and 214 directly.

Servers 208 and 209 generally represent any type or form of computing device that is capable of hosting and/or delivering applications and/or services online. Examples of servers 208 and 209 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and platform 206.

Figure 3:
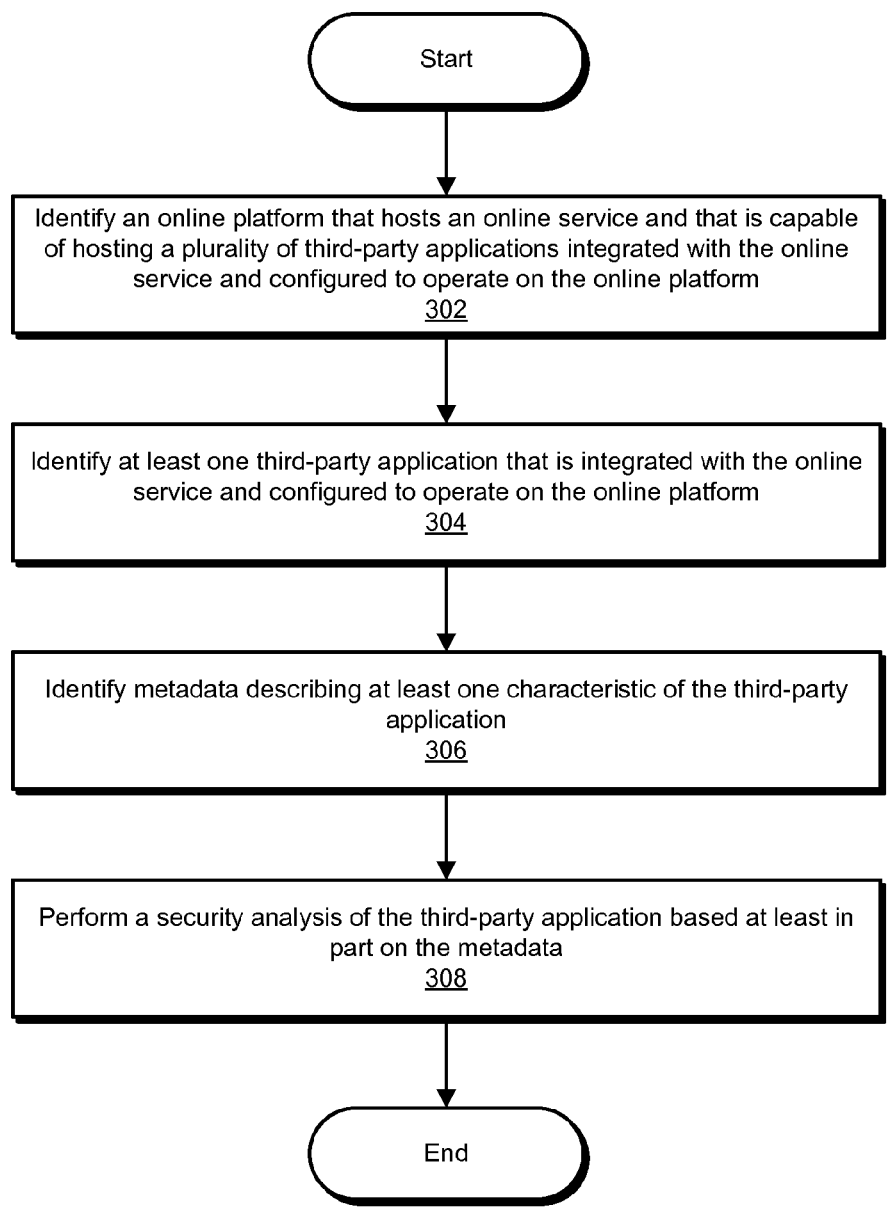
FIG. 3 is a flow diagram of an exemplary method for performing security analyses of applications configured for cloud-based platforms.

FIG. 3 is a flow diagram of an exemplary computer-implemented method 300 for performing security analyses of applications configured for cloud-based platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an online platform that hosts an online service and that is capable of hosting a plurality of third-party applications integrated with the online service and configured to operate on the online platform. For example, at step 302 identification module 104 may, as part of computing device 202 in FIG. 2, identify platform 206 that hosts service 210 and that is capable of hosting a plurality of third-party applications (e.g., applications 212 and 214) integrated with service 210 and configured to operate on platform 206.

As used herein, the phrase "online platform" may refer to any computing device and/or devices, software framework, and/or combination thereof usable for providing and/or hosting a service (e.g., via the Internet). As used herein, the phrase "online service" may refer to any of a variety of services and/or Internet sites. Examples of online services may include social networking services, online shopping services (e.g., EBAY), online gaming services, etc. As used herein, the phrase "social networking service" may refer to any service and/or Internet site that manages social connections and/or shares, compiles, formats, and/or broadcasts information based on social connections. Examples of social networking platforms may include FACEBOOK, TWITTER, GOOGLE+, LINKEDIN, and FLICKR. In some examples, the online service may host data and/or process the data via cloud-based applications (e.g., web-based email clients, online calendar applications, online picture albums, etc.) for personal and/or private use.

As used herein, the phrase "third-party application" may refer to any application that may be integrated with but which is separable from the online service. For example, the phrase "third-party application" may refer to an application that provides access to an additional service via the online service. Additionally or alternatively, the phrase "third-party application" may refer to an application that customizes an interaction with the online service. In some examples, the phrase "third-party application" may refer to an application that a user may enable and/or disable within the online service. Additionally or alternatively, the phrase "third-party application" may refer to an application developed independently from the online service (e.g., by a separate vendor instead of the vendor of the online service). In at least one example, the phrase "third-party application" may refer to an add-on application available for the online service. In some examples, the phrase "third-party application" may refer to an application specifically designed for and/or only operable via the online service. One example of a third-party application may include a flight booking application allowing a user to book a flight via a social networking service (e.g., by drawing on data previously provided by the user via the social networking service). Another example of a third-party application may include a design application allowing a user to customize a seller page presented via an e-commerce service.

Identification module 104 may identify the online platform in any suitable manner. For example, identification module 104 may identify the online platform by identifying a network address of the online platform. Additionally or alternatively, identification module 104 may identify the online platform by identifying a name and/or unique identifier of the online platform. In some examples, identification module 104 may identify the online platform by identifying the online service and/or one or more third-party applications configured to operate on the online platform.

Returning to FIG. 3, at step 304 one or more of the systems described herein may identify at least one third-party application that is integrated with the online service and configured to operate on the online platform. For example, at step 304 application module 106 may, as part of computing device 202 in FIG. 2, identify at least one third-party application (e.g., application 212) that is integrated with service 210 and configured to operate on platform 206.

Application module 106 may identify the third-party application in any of a variety of ways. For example, application module 106 may identify user-generated content within the online service that references the third-party application. As used herein, the phrase "user-generated content" may refer to any post, comment, and/or submission to and/or within the online service. For example, the user-generated content may include a post that names the third-party application, that links to the third-party application, and/or that responds to a post that names and/or links to the third-party application. As another example, application module 106 may identify the third-party application by identifying content generated by the third-party application within the online service. For example, application module 106 may identify a post, comment, and/or message generated by the third-party application (e.g., a post to a feed corresponding to a user account established for gathering information for the systems and methods described herein). Application module 106 may identify content generated by the third-party application with user prompting (e.g., a message transmitted by the third-party application with user input), content generated by the third-party application in response to user interaction (e.g., a post created in response to an event generated by the user interacting with the third-party application), and/or content otherwise generated (e.g., according to a schedule, in response to an environmental factor within the online service, etc.) by the third-party application.

In some examples, application module 106 may identify the third-party application by retrieving, from the online service, a list of third-party applications available on the online platform. For example, application module 106 may retrieve a list of third-party applications available on the online platform via an application programming interface of the online service. Additionally or alternatively, application module 106 may retrieve a list of third-party applications available on the online platform via an application of the online service (e.g., an application catalog application and/or an application store application of the online service). In an additional example, application module 106 may identify the third-party application by identifying a message and/or post (e.g., a wall post, a private message, an email, etc.) flagged by a spam filter that references the third-party application. For example, a spam filtering system may be configured to report spam contents to a security vendor. In this example, application module 106 and/or a separate application identification system may parse the spam to identify a reference to the third-party application. Application module 106 may then identify the reference to the third-party application. As another example, application module 106 may scan the online service (and/or one or more additional online services) for references to the application. For example, application module 106 may scan a wall and/or feed of one or more profiles within the online service for a reference to the third-party application, and/or scan messages sent within the online service for a reference to the third-party application.

Application module 106 may also crawl and/or scan the Internet to identify third-party applications for the online service. For example, application module 106 may scan Internet posts, Internet advertisements, and/or perform searches via search engines (e.g., searches that specify the online service by name and "application," "game," "add-on," and/or other terms as appropriate).

In some examples, application module 106 may identify the third-party application by receiving a message, retrieving the head of an analysis queue, and/or reading a configuration file identifying the third-party application.

Returning to FIG. 3, at step 306 one or more of the systems described herein may identify metadata describing at least one characteristic of the third-party application. For example, at step 306 metadata module 108 may, as part of computing device 202 in FIG. 2, identify metadata 220 describing characteristic 222 of application 212.

Metadata module 108 may identify the metadata in any of a variety of ways. In some examples, metadata module 108 may identify metadata previously gathered for analyzing the third-party application. Additionally or alternatively, metadata module 108 may gather the metadata. For example, metadata module 108 may identify the metadata by retrieving the metadata from an application programming interface of the online service (e.g., the FACEBOOK GRAPH API). Additionally or alternatively, metadata module 108 may identify the metadata by interacting with the third-party application during an active session with the online service. For example, metadata module 108 may access a user account with the online service usable for retrieving information about third-party applications with the online service. In this example, metadata module 108 may interact with, access, and/or execute the third-party application and monitor the user account, the online service, and/or the local client system for the behavior of the online service.

In some examples, metadata module 108 may identify the metadata by parsing a canvas page representing at least a portion of the third-party application to identify textual content within the canvas page, links within the canvas page, a structure of the canvas page, and/or one or more elements within the canvas page. As used herein, the phrase "canvas page" may refer to any Internet document relayed by the online service to portray, interface with, execute, and/or facilitate the third-party application. Accordingly, metadata module 108 may identify the textual content within the canvas page to identify one or more topics and/or key words within the textual content that may characterize the third-party application. Likewise, metadata module 108 may identify one or more links within the canvas page to identify one or more additional Internet resources (e.g., and, in turn, identify a classification of the additional Internet resources and impute the classification of the additional Internet resources to the third-party application). The structure of the canvas page may include any information about types of content within the canvas page, the layout of the content within the canvas page, and/or the predominance of one or more content types and/or elements within the canvas page. For example, metadata module 108 may identify a predominant interactive multimedia element within the canvas page (e.g., potentially indicative of a gaming application).

Metadata module 108 may identify any of a variety of types of metadata relating to the third-party application. For example, metadata module 108 may identify one or more permissions used by the third-party application within the online platform. As used herein, the term "permission" may refer to any permission, privilege, designated access right, and/or authentication for accessing, using, manipulating, and/or viewing data within the online service and/or using a capability of the online service. In some examples, the permission may be granted by a user at the time of enabling the third-party application for a user account. For example, the online service may be configured to display one or more permissions required and/or used by the third-party application and to receive verification that the user will grant the permissions to the third-party application before activating the third-party application. In some examples, the online service may divide a set of capabilities of the online platform into a set of permissions to access the capabilities, and grant a subset of permissions to each activated third-party application. Examples of permissions may include a permission to access user-submitted profile data, user activity data, and/or user social networking connections; permission to create posts and/or send messages to a user and/or the social networking connections of a user; and/or permissions to share designated data with other users of the online service, other third-party applications within the online service, and/or external services.

In some examples, metadata module 108 may identify the metadata by identifying a profile space for the third-party application within the online service and then identifying at least one user-submitted comment to the commenting feed on the profile space. As used herein, the phrase "profile space" may refer to any Internet resource and/or node provided by the online service to describe and/or aggregate information about an entity (e.g., a third-party application). As used herein, the phrase "commenting feed" may refer to any wall and/or aggregation of comments relating to a subject (e.g., a third-party application).

In some examples, the metadata may include a classification of the third-party application. For example, metadata module 108 may identify a classification already assigned to the third-party application. Additionally or alternatively, metadata module 108 may generate the classification for the third-party application. For example, metadata module 108 may determine, based on the metadata, that a vendor of the third-party application is also the vendor of an additional third-party application. As used herein, the term "vendor" may refer to any distinct entity designated as a creator, publisher, and/or distributor of an application. In some examples, the vendor of a third-party application may neither own nor control nor be owned or controlled by an entity that owns and/or controls the online service. Upon determining that the vendor of the third-party application is also the vendor of an additional third-party application, metadata module 108 may identify an attribute of the additional third-party application (e.g., a classification and/or category of the additional third-party application) and generate the classification at least in part based on the attribute of the additional third-party application. For example, metadata module 108 may impute a classification and/or category of the additional third-party application to the third-party application based on the shared vendor. In some examples, metadata module 108 may determine that the vendor of the third-party application is also the vendor of an application for a different platform (e.g., not the online platform). In these examples, metadata module 108 may similarly impute an attribute, classification, and/or category of the application for the different platform to the third-party application. For example, the additional third-party application may be identified as insecure, illegitimate, and/or malicious. In this example, metadata module 108 may attribute a vendor reputation of producing an insecure, illegitimate, and/or malicious application to the third-party application.

As mentioned earlier, in some examples one or more of the systems described herein may identify one or more permissions used by the third-party application within the online platform. In these examples, metadata module 108 may generate the classification by identifying a classification of applications with a legitimate use for the permission. For example, metadata module 108 may identify one or more classifications of applications that have been granted the permission. Additionally or alternatively, metadata module 108 may identify a table linking permissions and/or groups of permissions to likely categories of applications. For example, metadata module 108 may determine that a permission allowing the third-party application access to a user's relationship status may indicate that the third-party application is a dating application.

Metadata module 108 may generate the classification in any of a variety of ways. For example, metadata module 108 may identify multiple characteristics of the third-party application and identify a probable classification based on each characteristic. Metadata module 108 may then identify a most frequent classification of the characteristics of the third-party application as the classification of the third-party application. As another example, metadata module 108 may identify probabilities that the third-party application belongs to various classifications based on each characteristic of the third-party application. Metadata module 108 may then aggregate the probabilities to determine the most probable classification (e.g., using a suitable statistical method of inference such as a Bayesian inference).

In some examples, metadata module 108 may identify the metadata by identifying a classification of the third-party application. For example, metadata may identify a classification of "Game," "Productivity," "Organization," "Travel," etc. In these examples, metadata module 108 may also 1) identify an expected behavior of the third-party application based at least in part on the classification and 2) identify an actual behavior of the third-party application. The expected behavior may relate to any of a variety of types of behavior. For example, the expected behavior may relate to whether or not the third-party application uses certain features of the online service, such as creating posts on walls, sending messages, accessing data, generating notifications, creating events, modifying settings, etc. In some examples, the expected behavior may define a range of expected behavior. For example, metadata module 108 may identify a frequency threshold above which a behavior is so frequent that the behavior is considered unexpected based on the classification. As will be explained in greater detail below, in some examples one or more of the systems described herein may compare the expected behavior with the actual behavior in the course of analyzing the third-party application.

In some embodiments, metadata module 108 may identify the metadata by 1) identifying a classification of the third-party application and 2) identifying at least one permission used by the third-party application within the online platform. In these embodiments, metadata module 108 may also identify a set of expected permissions to be used by the third-party application based on the classification of the third-party application. For example, the online service may allow a user to associate a relationship status with a profile of the user. In this example, the online platform may allow third-party applications to access the relationship status if the third-party applications have a permission to access the relationship status. Accordingly, metadata module 108 may identify an expected permission table that defines the permission to access the relationship status as an expected permission for third-party applications with a "Dating" classification and/or which defines the permission to access the relationship status as unexpected for third-party applications with a "Weather" classification. As will be explained in greater detail below, in some examples one or more of the systems described herein may compare the expected behavior with the actual behavior in the course of analyzing the third-party application.

In one example, metadata module 108 may identify the metadata by 1) identifying an actual vendor of the third-party application and 2) identifying user-facing content within the third-party application indicating an apparent vendor of the third-party application. The user-facing content may include any content presented by and/or configured to be presented by the third-party application. For example, the user-facing content may text within a name of the third-party application, text within a description of the third-party application, and/or text within a canvas page of the third-party application. In some examples, the text indicating the apparent vendor may include a name of another vendor (e.g., different from the actual vendor of the third-party application). As will be explained in greater detail below, in some examples one or more of the systems described herein may determine that the actual vendor differs from the apparent vendor in the course of analyzing the third-party application. Additionally, in some examples, metadata module 108 may identify a location of the third-party application (e.g., a server, domain, and/or address hosting the third-party application and/or content for the third-party application) referenced by the online service. In these examples, the apparent vendor of the third-party application may be inconsistent with the location of the third-party application (e.g., the third-party application may not be hosted at a location normally used by the apparent vendor).

In one embodiment, metadata module 108 may identify the metadata by 1) identifying a classification of the third-party application, 2) identifying content generated by the third-party application within the online service, and 3) analyzing the content to identify at least one topic of the content. In this embodiment, metadata module 108 may also identify an expected topic of the third-party application based on the classification. For example, metadata module 108 may identify a classification assigned to the third-party application within the online service (e.g., a classification provided to the online service by a vendor). Accordingly, metadata module 108 may consult a table of expected content topics of third-party applications with the classification. For example, metadata module 108 may determine that a third-party application with a classification of "Weather" is expected to generate content with topics such as "weather," "outdoors," "allergies," "temperatures," "astronomy," etc. As will be explained in greater detail below, in some examples one or more of the systems described herein may determine that topic of the content is unrelated to the expected topic of the third-party application in the course of analyzing the third-party application.

In some examples, metadata module 108 may identify the metadata by 1) identifying a classification of the third-party application and 2) identifying a volume of content generated by the third-party application within the online service. In these examples, metadata module 108 may also identify an expected volume of content generated by the third-party application based on the classification. For example, metadata module 108 may identify a table relating classifications of third-party applications to amounts of content expected to be generated by third-party applications of the respective classifications. In some examples, metadata module 108 may identify a range of expected content-generation volume and/or update frequencies. For example, metadata module 108 may identify a third-party application classified as "Social" and expect a high volume of content generated by the third-party application (e.g., messages, wall posts, invitations, etc.). Conversely, metadata module 108 may identify a third-party application classified as "Weather" and expect a low volume of content generated by the third-party application (e.g., few messages, wall posts, etc.). As will be explained in greater detail below, in some examples one or more of the systems described herein may determine that actual volume of content generated by the third-party application differs from (e.g., exceeds) the expected volume of content generated by the third-party application in the course of analyzing the third-party application.

In some embodiments, metadata module 108 may identify the metadata by 1) identifying content within a canvas page including at least a portion of the third-party application and 2) identifying an Internet resource provided via the canvas page. For example, metadata module 108 may identify a reference to the Internet resource causing the Internet resource to load into the canvas page. Additionally or alternatively, metadata module 108 may identify a link to the Internet resource, potentially allowing a user to navigate to the Internet resource and/or retrieve the Internet resource from the canvas page. As will be explained in greater detail below, in some examples, one or more of the systems described herein may determine that the Internet resource is malicious in the course of analyzing the third-party application.

In one example, metadata module 108 may identify the metadata by identifying content generated by the third-party application within the online service. For example, metadata module 108 may identify content generated by the third-party application advertising the third-party application, a different third-party application for the online service, a different application for a different platform, an Internet site, a product, an affiliate and/or referral link, etc. As will be explained in greater detail below, in some examples one or more of the systems described herein may determine that the content generated by the third-party application includes spam content in the course of analyzing the third-party application. In some examples, one or more of the systems described herein may determine that the content generated by the third-party application includes and/or references malicious content (e.g., malware, phishing-related content, etc.).

In some examples, metadata module 108 may identify the metadata by identifying at least one rating used to describe the third-party application. For example, metadata module 108 may identify the rating from the online service and/or from a review site. In some examples, the rating may include reputation data from a community of users indicating whether the third-party application is trustworthy. Additionally or alternatively, metadata module 108 may generate the rating based on positive and/or negative keywords and topics in user comments and/or messages regarding the third-party application (e.g., by mining the online service for user comments and/or messages regarding the third-party application). As will be explained in greater detail below, in some examples one or more of the systems described herein may determine that the rating falls below a predetermined threshold in the course of analyzing the third-party application.

In some embodiments, metadata module 108 may identify the metadata by identifying a user account for the online service usable for testing third-party application integrated with the online service. For example, metadata module 108 may identify a user account set apart for testing third-party applications within the online service. In these embodiments, metadata module 108 may log in to the online service with the user account in order to test the third-party application. As will be explained in greater detail below, in some examples one or more of the systems described herein may load the third-party application within the online service via the user account in the course of analyzing the third-party application.

FIG. 4 illustrates exemplary metadata collection 400. As shown in FIG. 4, metadata collection 400 may include metadata 410 and metadata 420. Metadata 410 may include a variety of metadata collected about a third-party application for an online service (i.e., "Free Poker Deluxe"), including the name of the vendor, categories of applications developed by the vendor, topics identified in one or more posts generated by the third-party application (e.g., extracted from the description using a topic model such as latent Dirichlet allocation), topics identified in one or more messages sent by the third-party application, topics identified in a description of the third-party application, topics identified in comments referencing the third-party application, and/or permissions requested by, granted to, and/or used by the third-party application (e.g., a permission to post to a user's content stream and to content streams of the user's friends on the online service). Metadata 420 may similarly include metadata collected about an additional third-party application for the online service (i.e., "Digital Album Maker"). Using FIG. 4 as an example, at step 306 metadata module 108 may identify metadata 410 for "Free Poker Deluxe" (e.g., gathered from one or many sources) and/or metadata 420 for "Digital Album Maker."

Returning to FIG. 3, at step 308 one or more of the systems described herein may perform a security analysis of the third-party application based at least in part on the metadata. For example, at step 308 security module 110 may, as part of computing device 202 in FIG. 2, perform security analysis 230 of application 212 based at least in part on metadata 220 (e.g., based on characteristic 222).

Security module 110 may perform the security analysis in any of a variety of ways and based on any of a variety of criteria. For example, as mentioned earlier, in some examples, metadata module 108 may identify the metadata by identifying a classification of the third-party application (e.g., "Game," "Productivity," "Organization," "Travel," etc.), as well as identifying an expected behavior of the third-party application (e.g., based on the classification) and an actual behavior of the third-party application. In these examples, security module 110 may perform the security analysis by comparing the expected behavior with the actual behavior in the course of analyzing the third-party application. For example, security module 110 may determine that the actual behavior of the third-party application does not fit within an expected range of behaviors of the third-party application. For example, security module 110 may determine that the third-party application is malicious by determining that a classification of the third-party application (e.g., "Weather") indicates that a behavior of the third-party application (e.g., requesting bank account information from a user) is unexpected.

In some embodiments, as mentioned earlier, metadata module 108 may identify a classification of the third-party application and one or more permissions used by the third-party application within the online platform, along with a set of expected permissions to be used by the third-party application (e.g., based on the classification of the third-party application). Accordingly, security module 110 may determine that the third-party application is malicious by determining that a permission used by the third-party application is not an expected permission (e.g., a third-party application classified as a "Weather" application attempting to access the relationship status of a user within a user profile of the online service).

In one example, as mentioned earlier, metadata module 108 may identify the metadata by identifying an actual vendor of the third-party application and identifying user-facing content within the third-party application indicating an apparent vendor of the third-party application. Accordingly, security module 110 may perform the security analysis in part by determining that the third-party application is untrustworthy and/or malicious based on the actual vendor not matching the apparent vendor. For example, security module 110 may determine that the third-party application is a phishing threat (e.g., for bank account information, email account passwords, etc.).

In one embodiment, as mentioned earlier, metadata module 108 may identify a classification of the third-party application, extract one or more topics from content generated by the third-party application, and identify an expected topic of the third-party application based on the classification. In this embodiment, security module 110 may perform the security analysis by determining that the expected topic does not match the topic of content. For example, security module 110 may determine that the probability of the topic being a legitimate topic falls below a predetermined threshold given the classification of the third-party application. For example, security module 110 may determine that a third-party application with a classification of "Weather" that generates messages within the online service about dating is an illegitimate and/or malicious application by determining that topics related to weather do not include dating.

In some examples, as explained earlier, metadata module 108 may identify a classification of the third-party application and determine how much content the third-party application generates within the online service (e.g., via posts, messages, and/or notifications, etc.), as well as how much content is expected given the classification of the third-party application. In these examples, security module 110 may perform the security analysis by determining that the third-party application may be illegitimate and/or malicious by determining that the third-party application generates more content than expected given the classification of the third-party application. For example, third-party application may be classified as a "Weather" application but may generate large volumes of posts and messages. Accordingly, security module 110 may perform the security analysis by determining that the amount of content generated by the third-party application is suspicious given the classification, and that the third-party application may therefore be illegitimate and/or malicious.

In some embodiments, as mentioned earlier, metadata module 108 may identify an Internet resource provided via a canvas page of the third-party application. In these embodiments, security module 110 may perform the security analysis of the third-party application by evaluating the Internet resource. For example, security module 110 may query a database to determine that the Internet resource is on a blacklist and/or is an untrusted resource. Additionally or alternatively, security module 110 may scan the Internet resource to identify suspicious behavior and/or content produced by and/or found within the Internet resource. Accordingly, security module 110 may determine that the third-party application is illegitimate, malicious, and/or unsafe by determine that the Internet resource is malicious.

In one example, as mentioned earlier, metadata module 108 may identify content generated by the third-party application within the online service. In this example, security module 110 may perform the security analysis by determining that the third-party application includes spam content. For example, security module 110 may apply one or more spam filters and/or spam recognition procedures to the content to identify the content as spam.

In some examples, as mentioned earlier, metadata module 108 may identify at least one rating used to describe the third-party application. In this example, security module 110 may perform the security analysis by using the rating to evaluate the third-party application. For example, security module 110 may determine that the third-party application is illegitimate and/or malicious by determining that the rating falls below a predetermined threshold.

In some embodiments, as mentioned earlier, metadata module 108 may identify and log in to user account for the online service usable for testing third-party application integrated with the online service. In these embodiments, security module 110 may perform the security analysis by performing a static and/or dynamic analysis of the third-party application via the user account of the online service. In these embodiments, security module 110 may use any appropriate signature-based, content-based, heuristic-based, and/or behavioral-based analysis methods for identifying malicious web applications.

Generally, security module 110 may use any appropriate techniques for evaluating the security of the third-party application, including any of the above-described techniques in any combination. For example, security module 110 may combine multiple factors using a logical flow and/or a cumulative scoring system.

Using FIG. 4 as an example, security module 110 may determine, based on metadata 410, that "Free Poker Deluxe" is potentially illegitimate or malicious. For example, security module 110 may determine that the "Free Poker Deluxe" application is represented as a "Games" category application, but that the "Coupons" topic found in posts generated by the application is incongruent with (e.g., not listed as an expected topic for) the "Games" category. Furthermore, security module 110 may determine that the "Medicine" and "Investment" topics found within messages sent by the application are incongruent with the "Games" category. In addition, security module 110 may determine that the "Fraud" topic found within user comments about the application is both incongruent with the "Games" category and inherently suspicious. Also, security module 110 may determine that some of the permissions used by the application (e.g., "Access-Phone-Number" and "Access-Contacts") are incongruent with the "Games" classification. Security module 110 may aggregate these determinations (e.g., using a scoring system), to determine that the probability that the third-party application is illegitimate exceeds a predetermined threshold (and/or that the risk posed by the third-party application exceeds a predetermined threshold).

Conversely, security module 110 may determine, based on metadata 420, that "Digital Album Maker" is likely legitimate due to the congruence between the "Photography" classification of the application and the photography-related topics generated by and about the application. Additionally, security module 110 may find that the permissions used by the application (e.g., "Post-to-Stream" and "Access-Albums") are expected given the classification.

FIG. 5 illustrates exemplary metadata 500. As shown in FIG. 5, metadata 500 may include a variety of metadata collected about a third-party application for an online service (i.e., "Quiz-and-Win"), including the name of the vendor as represented by the application (e.g., "Symantec"), a location at which the content of the third-party application is stored and/or hosted (e.g., "example.com/malware"), a type and/or categorization of the third-party application (e.g., "Quiz" and "Drugs"), topics identified in one or more posts generated by the third-party application (e.g., "Banking"), the frequency with which posts are generated by the third-party application (e.g., 10 messages per day for each user), content within the canvas document of the application (e.g., download links to executable content), and/or permissions requested by, granted to, and/or used by the third-party application (e.g., a permission to post to a user's wall and a permission to manage a user's friend connections within the online service).

As shown in FIG. 5, security module 110 may also produce assessments of the various metadata elements of the third-party application. For example, security module 110 may determine that "example.com/malware" is not a legitimate location for third-party applications by Symantec (e.g., implying that the third-party application is falsely representing its vendor) and may therefore flag the third-party application. Additionally, security module 110 may flag the third-party application for including drug-related content. Security module 110 may also determine, based on the content generated by the third-party application, that the third-party application poses a phishing threat. Security module 110 may further flag the third-party application as generating spam based on the frequency with which the third-party application generates content within the online service. Additionally, security module 110 may identify a link to download an executable file and, after analyzing the file, determine that the file includes a virus. Accordingly, security module 110 may flag the third-party application for the threat of spreading malware. Security module 110 may also flag the third-party application for requiring and/or using a permission that is not usual and/or germane to a category of the third-party application.

In some examples, security module 110 may also perform one or more remediation actions upon determining that the third-party application poses a security risk. For example, security module 110 may report the third-party application to the online service, a security vendor, and/or a user. Additionally or alternatively, security module 110 may block the third-party application from loading. In some examples, security module 110 may deny permissions within the online platform to the third-party application.

As explained above, by identifying the applications (e.g., as separate from the cloud-based platforms which host them) and identifying metadata (e.g., by requesting, extracting, crawling for, and/or mining for the metadata) useful for providing context to the applications (e.g., for the trustworthiness of the applications, the expected behavior of the applications, etc.), the systems and methods described herein may facilitate and/or enable the limiting of access to illegitimate, malicious, and/or undesired third-party applications within otherwise trusted cloud-based platforms.

Figure 6:
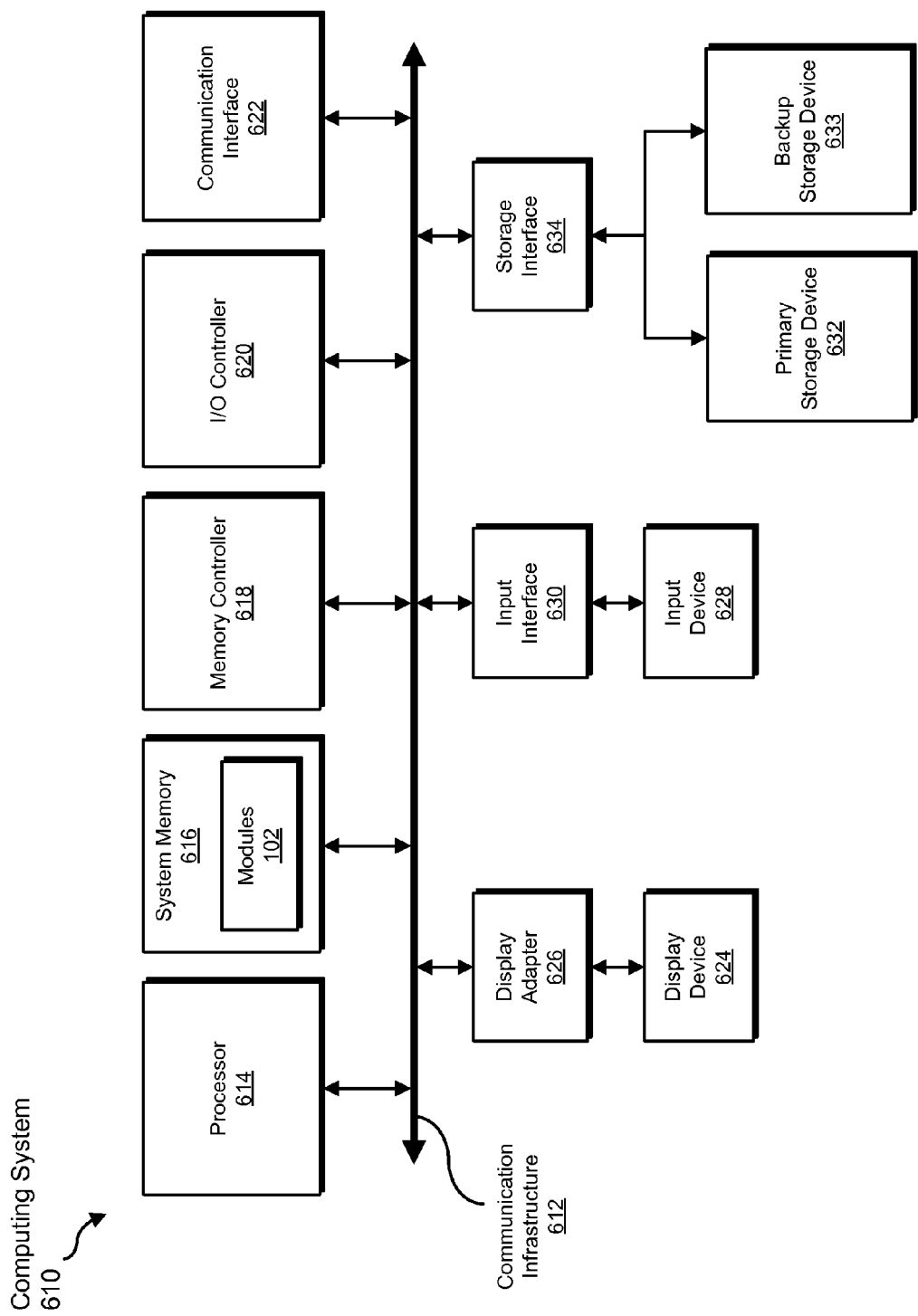
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, analyzing, generating, performing, testing, and determining steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
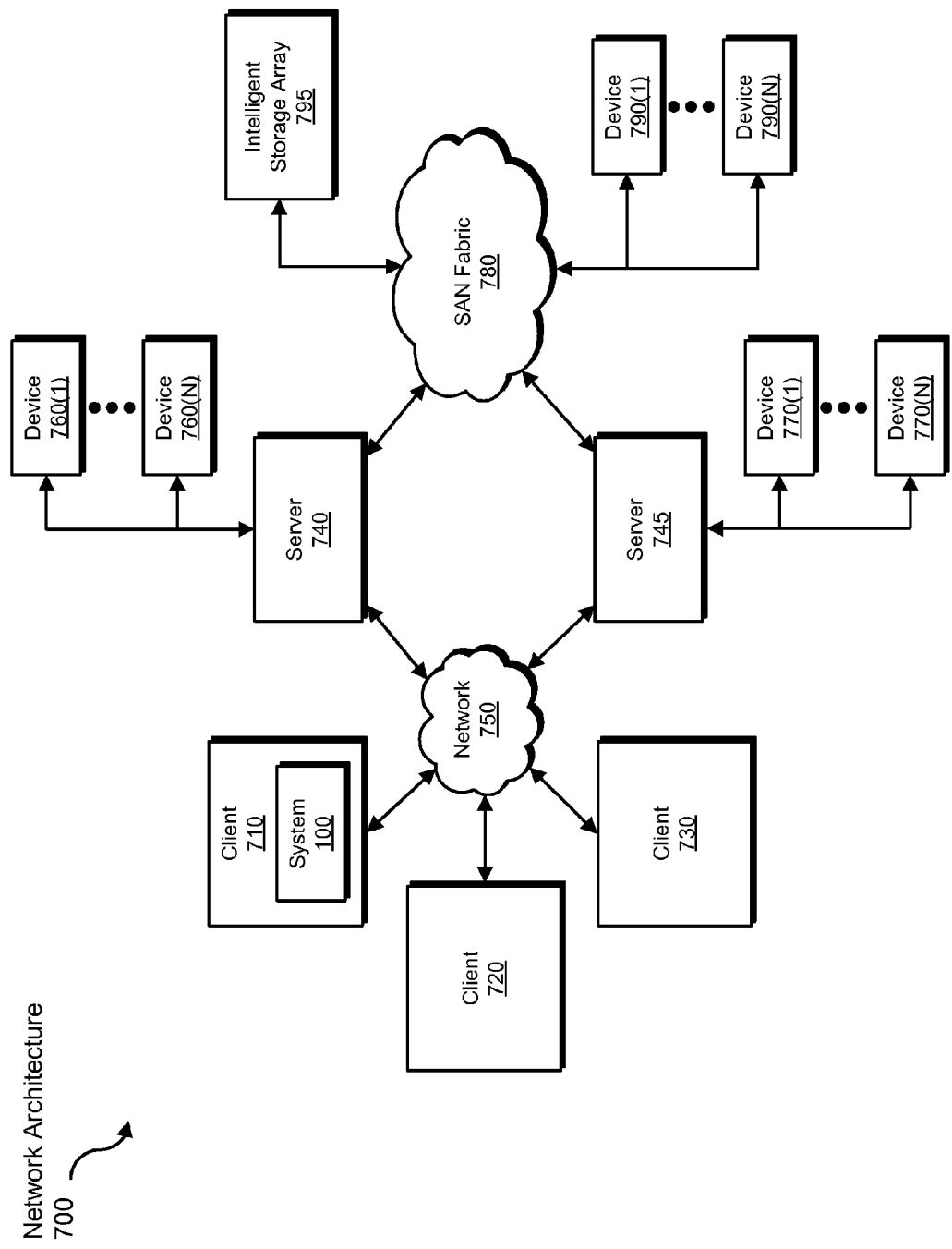
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, analyzing, generating, performing, testing, and determining steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for performing security analyses of applications configured for cloud-based platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for performing security analyses of third-party applications configured for cloud-based platforms.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing security analyses of applications configured for cloud-based platforms, at least a portion of the method being performed by a computing device comprising at least one processor, the method comprising:
   identifying an online platform that hosts an online service and that is capable of hosting a plurality of third-party applications integrated with the online service and configured to operate on the online platform, wherein the online service hosts and/or processes data via one or more cloud-based applications;
   identifying, by a security system separate from the online service, at least one third-party application by identifying user-facing content within the online service that references the third-party application, the third-party application being:
      separate from and configured to operate on the online platform;
      specifically designed to be integrated with the online service and enhancing the online service by customizing an interaction with the online service;
   retrieving, from the online service by the security system, metadata describing:
      at least one characteristic of the third-party application;
      the interaction of the third-party application with the online service;
      an internet resource provided via a canvas page that comprises at least a portion of the third-party application;
   in response to determining that the third-party application is separate from the online platform, performing, by the security system, a security analysis of the third-party application instead of the online service that determines a most probable classification of the third-party application, based at least in part on the metadata describing at least one characteristic of the third-party application, the interaction of the third-party application with the online service, and the internet resource provided via the canvas page, and flagging the third-party application as malicious based on the security analysis.

2. The computer-implemented method of claim 1, wherein:
   the online service comprises an internet site that provides a service to a user;
   the third-party application customizes the interaction with the online service by providing an additional service to the user via the internet site.

3. The computer-implemented method of claim 1, further comprising:
   retrieving the metadata by:
      identifying a classification of the third-party application;
      identifying at least one permission used by the third-party application within the online platform;
   identifying a set of expected permissions to be used by the third-party application based on the classification of the third-party application;
   wherein performing the security analysis further comprises determining that the permission used by the third-party application is not within the set of expected permissions.

4. The computer-implemented method of claim 1,
   wherein retrieving the metadata further comprises:
      identifying an actual vendor of the third-party application;
      identifying user-facing content within the third-party application indicating an apparent vendor of the third-party application;
   wherein performing the security analysis further comprises determining that the actual vendor of the third-party application differs from the apparent vendor of the third-party application.

5. The computer-implemented method of claim 1, further comprising:
   retrieving the metadata by:
      identifying a classification of the third-party application;

identifying content generated by the third-party application within the online service;

analyzing the content to identify at least one topic of the content;

identifying an expected topic of the third-party application based on the classification;

wherein performing the security analysis further comprises determining that the expected topic does not match the topic of the content.

6. The computer-implemented method of claim 1, further comprising:

retrieving the metadata by:

identifying a classification of the third-party application;

identifying a volume of content generated by the third-party application within the online service;

identifying an expected volume of content generated by the third-party application based on the classification;

wherein performing the security analysis further comprises determining that the volume of content generated by the third-party application exceeds the expected volume of content.

7. The computer-implemented method of claim 1, wherein retrieving the metadata further comprises identifying content generated by the third-party application within the online service;

wherein performing the security analysis further comprises determining that the content generated by the third-party application comprises spam content.

8. The computer-implemented method of claim 1, wherein retrieving the metadata further comprises identifying at least one rating used to describe the third-party application;

wherein performing the security analysis further comprises determining that the rating falls below a predetermined threshold.

9. The computer-implemented method of claim 1, wherein retrieving the metadata further comprises identifying a user account for the online service usable for testing third-party applications integrated with the online service;

wherein performing the security analysis further comprises loading the third-party application within the online service via the user account.

10. A system for performing security analyses of applications configured for cloud-based platforms, the system comprising:

an identification module programmed to identify an online platform that hosts an online service and that is capable of hosting a plurality of third-party applications integrated with the online service and configured to operate on the online platform, wherein the online service hosts and/or processes data via one or more cloud-based applications;

an application module programmed to identify, from a security server separate from the online service, at least one third-party application by identifying user-facing content within the online service that references the third-party application, the third-party application being:

separate from and configured to operate on the online platform;

specifically designed to be integrated with the online service and enhancing the online service by customizing an interaction with the online service;

a metadata module programmed to retrieve, from the security server, metadata from within the online service describing:

at least one characteristic of the third-party application;

the interaction of the third-party application with the online service;

an internet resource provided via a canvas page that comprises at least a portion of the third-party application;

a security module programmed to perform, from the security server and in response to determining that the third-party application is separate from the online platform, a security analysis of the third-party application instead of the online service that determines a most probable classification of the third-party application, based at least in part on the metadata describing at least one characteristic of the third-party application, the interaction of the third-party application with the online service, and the internet resource provided via the canvas page, and flagging the third-party application as malicious based on the security analysis;

at least one hardware processor configured to execute the identification module, the application module, the metadata module, and the security module.

11. The system of claim 10, wherein:

the online service comprises an internet site that provides a service to a user;

the third-party application customizes the interaction with the online service by providing an additional service to the user via the internet site.

12. The system of claim 10, wherein the metadata module is further programmed to retrieve the metadata by:

identifying a classification of the third-party application;

identifying at least one permission used by the third-party application within the online platform;

wherein the metadata module is further programmed to identify a set of expected permissions to be used by the third-party application based on the classification of the third-party application;

wherein the security module is further programmed to perform the security analysis by determining that the permission used by the third-party application is not within the set of expected permissions.

13. The system of claim 10, wherein the metadata module is further programmed to retrieve the metadata by:

identifying an actual vendor of the third-party application;

identifying user-facing content within the third-party application indicating an apparent vendor of the third-party application;

wherein the security module is further programmed to perform the security analysis by determining that the actual vendor of the third-party application differs from the apparent vendor of the third-party application.

14. The system of claim 10, wherein the metadata module is further programmed to retrieve the metadata by:

identifying a classification of the third-party application;

identifying content generated by the third-party application within the online service;

analyzing the content to identify at least one topic of the content;

wherein the metadata module is further programmed to identify an expected topic of the third-party application based on the classification;

wherein the security module is further programmed to perform the security analysis by determining that the expected topic does not match the topic of the content.

15. The system of claim 10, wherein the metadata module is further programmed to retrieve the metadata by:
- identifying a classification of the third-party application;
- identifying a volume of content generated by the third-party application within the online service;

wherein the metadata module is further programmed to identify an expected volume of content generated by the third-party application based on the classification;

wherein the security module is further programmed to perform the security analysis by determining that the volume of content generated by the third-party application exceeds the expected volume of content.

16. The system of claim 10, wherein the metadata module is further programmed to retrieve the metadata by identifying content generated by the third-party application within the online service;

wherein the security module is further programmed to perform the security analysis by determining that the content generated by the third-party application comprises spam content.

17. The system of claim 10, wherein the metadata module is further programmed to retrieve the metadata by identifying at least one rating used to describe the third-party application;

wherein the security module is further programmed to perform the security analysis by determining that the rating falls below a predetermined threshold.

18. A non-transitory computer-readable-storage medium comprising one or more computer-executable instructions that, when executed by at least one processor of a computing device, cause the computing device to:
- identify an online platform that hosts an online service and that is capable of hosting a plurality of third-party applications integrated with the online service and configured to operate on the online platform, wherein the online service hosts and/or processes data via one or more cloud-based applications;
- identify, from a security server separate from the online service, at least one third-party application by identifying user-facing content within the online service that references the third-party application, the third-party application being:
  - separate from and configured to operate on the online platform;
  - specifically designed to be integrated with the online service and enhancing the online service by customizing an interaction with the online service;
- retrieve, from the security server, metadata from within the online service describing:
  - at least one characteristic of the third-party application;
  - the interaction of the third-party application with the online service;
  - an internet resource provided via a canvas page that comprises at least a portion of the third-party application;
- in response to determining that the third-party application is separate from the online platform, perform, from the security server, a security analysis of the third-party application instead of the online service that determines a most probable classification of the third-party application, based at least in part on the metadata describing at least one characteristic of the third-party application, the interaction of the third-party application with the online service, and the internet resource provided via canvas page, and flagging the third-party application as malicious based on the security analysis.

19. The non-transitory computer-readable-storage medium of claim 18, wherein:
- the online service comprises an internet site that provides a service to a user;
- the third-party application customizes the interaction with the online service by providing an additional service to the user via the internet site.

20. The non-transitory computer-readable-storage medium of claim 18, wherein the one or more computer-executable instructions further cause the computing device to:
- retrieve the metadata by:
  - identifying a classification of the third-party application;
  - identifying at least one permission used by the third-party application within the online platform;
- identify a set of expected permissions to be used by the third-party application based on the classification of the third-party application;
- perform the security analysis by determining that the permission used by the third-party application is not within the set of expected permissions.

* * * * *